United States Patent [19]

Witzky

[11] 4,126,106
[45] Nov. 21, 1978

[54] MIXED CYCLE INTERNAL COMBUSTION ENGINE

[75] Inventor: Julius E. Witzky, San Antonio, Tex.

[73] Assignee: Southwest Research Institute, San Antonio, Tex.

[21] Appl. No.: 830,504

[22] Filed: Sep. 6, 1977

[51] Int. Cl.² ............................................. F02B 17/00
[52] U.S. Cl. ............................. 123/30 D; 123/32 ST; 123/DIG. 4; 123/DIG. 7
[58] Field of Search .............. 123/30 D, 30 E, 32 ST, 123/32 SJ, DIG. 4, DIG. 7

[56] References Cited

U.S. PATENT DOCUMENTS

| Re. 25,578 | 5/1964 | Witzky | 123/32 ST |
|---|---|---|---|
| 2,332,928 | 10/1943 | Pischinger et al. | 123/33 D |
| 2,753,852 | 7/1956 | Beller | 123/32 SP |
| 3,094,974 | 6/1963 | Barber | 123/32 SA |
| 3,140,697 | 7/1964 | Peras | 123/32 R |
| 3,154,059 | 10/1964 | Witzky et al. | 123/32 ST |
| 3,304,922 | 2/1967 | Hideg | 123/30 D X |
| 3,658,046 | 4/1972 | Winkler | 123/32 ST |
| 3,703,886 | 11/1972 | Witzky | 123/32 ST |
| 3,814,067 | 6/1974 | De La Fugnte | 123/32 ST |
| 3,924,584 | 12/1975 | Decker | 123/32 ST |

OTHER PUBLICATIONS

"Investigation of the Possibilities of Process Improvement with IC Engines" by Dr. Franz Pischinger & Eng., Gerhard Schmidt, MTZ Matortechnische Zeitschrift 37, (4) pp. 127-130 (1976).

*Primary Examiner*—Edgar W. Geoghegan
*Attorney, Agent, or Firm*—Fulbright & Jaworski

[57] ABSTRACT

An internal combustion engine which operates under Otto cycle during starting, idle and low load operations and which operates on a diesel cycle during high load operations. A first combustion chamber is formed in the head of an internal combustion engine and is smaller in diameter than the second combustion chamber formed by the containing surfaces of the piston and cylinder below the head. An air swirl is created in the second chamber through the intake valve, and as the piston reaches top dead center, the swirl is transferred to the first combustion chamber. Ignition means is provided in the first combustion chamber. A fuel injector is provided in the first combustion chamber and directs fuel against the direction of the swirling air for forming a stratified fuel charge around the ignition means for operating the engine on the Ott cycle during start, idle and low load operation. Upon an increased load, the fuel injection directs and impinges the increased mass of fuel on the hot wall of the first combustion chamber and the mixture is ignited by compression and operated on the diesel cycle. The engine can operate on a much lower compression ratio than conventional diesel engines, is fuel insensitive, and reduces exhaust pollutants.

6 Claims, 4 Drawing Figures

MIXED CYCLE INTERNAL COMBUSTION ENGINE

BACKGROUND OF THE INVENTION

Automobile type diesel engines employ high compression ratios such as 22:1. This high compression ratio is required only to start the engine and to keep the engine going at idle and light load operation. However, when the diesel engine is warm and at road or high load, the compression ratio could be reduced to approximately 12:1. The use of a low compression ratio would have the advantages of reducing friction and structural loading of the engine, and reducing $NO_x$ due to the lower temperature.

While it has been proposed to use a mixed cycle internal combustion engine operating on both an Otto and a diesel cycle, such proposals have not led to a successful commercial engine. The present invention is directed to an improved mixed cycle internal combustion engine which (1) reduces engine friction by reducing the compression ratio, (2) is insensitive to fuel quality and the engine has no octane, volatility, or cetane requirement, (3) the engine starts easily and will idle without the diesel knock of conventional diesel engines, (4) thermal efficiency is about the same as conventional diesel engines but overall efficiency should be better than conventional diesels because of the reduced compression ratio and therefore reduced friction, (5) emission pollutants are low, (6) by using ignition means the combustion delay period is reduced and a better control of combustion is obtained, (7) the fuel is injected directly into the combustion chamber and preignition or knock is avoided thereby eliminating the octane number requirement, and (8) since the fuel is ignited by an ignition source the cetane number is no more of any significance.

SUMMARY

The present invention is directed to a mixed cycle internal combustion engine which utilizes a stratified charge Otto cycle during starting, idle and light load operations, and utilizes the diesel cycle at road or high loads. The present engine includes a reciprocating piston in a cylinder and a cylinder head on the cylinder. A first combustion chamber is formed in the head and an adjacent second combustion chamber is formed by the opposed surfaces of the piston and cylinder below the head. Ignition means and fuel injection means are provided in the first chamber and means are provided for creating an air swirl in the chamber. During start, idle and low load operation, the fuel is directed against the direction of the swirling air for forming a stratified fuel charge surrounding the ignition means and the engine will operate on the Otto cycle, but during high loads the amount of fuel is increased and will penetrate the swirling air and impinge on the hot wall of the first chamber and the engine will operate on the diesel cycle. By reducing the compression ratio, a lighter weight engine can be built and engine friction is reduced.

Still a further object of the present invention is that the fuel is injected directly into a combustion chamber and ignited during its operation on the Otto cycle by an ignition source, and during the diesel cycle the fuel is injected directly into the combustion space and ignited by compression whereby the engine is insensitive to fuel quality.

Yet a still further object of the present invention is the provision of a mixed cycle internal combustion engine which allows the use of a lower compression ratio with its consequential benefits which is operated on an Otto cycle for overcoming the problems of starting, idling and low loading conditions by the use of a stratified charged Otto cycle, and during high load operation, the engine is operated on the diesel cycle by injecting the fuel charge against a hot combustion chamber wall as the fuel evaporates from the hot wall.

Other and further objects, features and advantages will be apparent from the following description of a presently preferred embodiment of the invention, given for the purpose of disclosure and taken in conjunction with the drawings.

BRIEF DESCRIPTION OF THE PREFERRED EMBODIMENT

Figure 1:
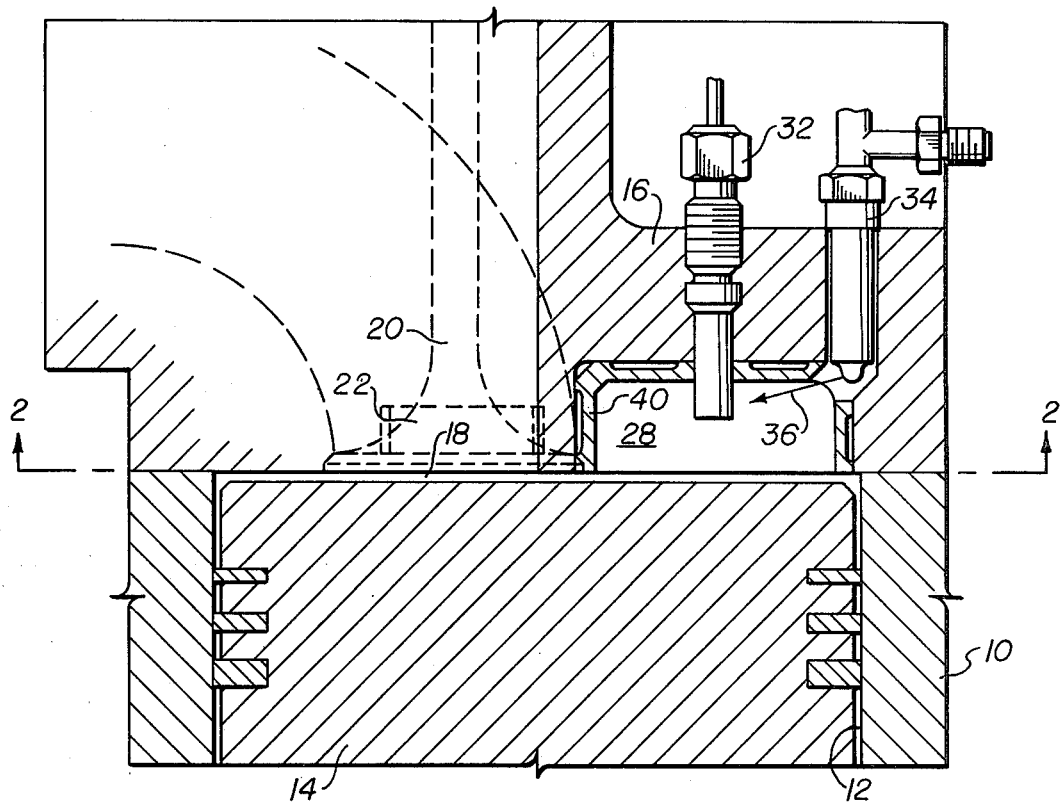
FIG. 1 is a sectional view taken along the line 1—1 of FIG. 2.
Figure 2:
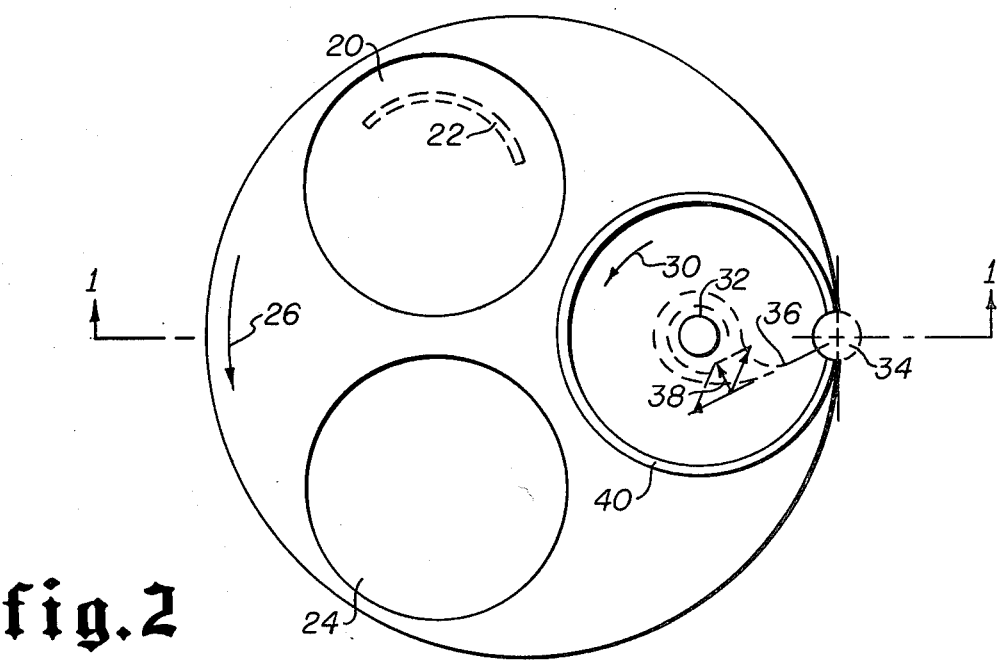
FIG. 2 is a partial horizontal sectional view along the line 2—2 of FIG. 1 through an engine cylinder embodying the present invention showing the swirling motion of the intake air during the intake stroke of the piston and the resulting stratification during starting, idling and low load operation.

Referring to the drawings, and particularly to FIGS. 1 and 2, an internal combustion engine generally indicated by the reference numeral 10 includes as is conventional a cylinder 12, a reciprocating piston 14 therein, a cylinder head 16 connected to the cylinder 12 in which the opposing surfaces of the cylinder 12, the piston 14, and the head 16 form a very narrow chamber 18 below said head 16 when the piston 14 is at top dead center. An inlet valve 20 controls the emission of air and a conventional exhaust valve 24 is provided for exhausting the gasses. By using a shroud 22 on the inlet valve 20, the air is forced to rotate inside the chamber 18 as indicated by the arrow 26.

Other means can be provided to achieve the swirling air in chamber 18 through the use of a swirl port or a tangentially arranged intake port.

A first combustion chamber 28 is provided in the head 16 adjacent the second combustion chamber 18. As noted in FIG. 2, the air flowing through the shrouded intake valve 20 during the intake stroke produces the swirling air in the second combustion chamber 18 as indicated by the arrow 26. As the piston 14 reaches top dead center, the air swirl is transferred to the first combustion chamber 28. Ignition means which may be a spark plug or glow plug, here shown as glow plug 32, is provided in the first combustion chamber 28, preferably in the center of the first chamber 28. A fuel injector 34 is positioned in the first combustion chamber 28 and directs fuel against the direction 30 of the swirling air in the first combustion chamber 28.

Conventional automotive diesel engines have a high compression ratio, on the order of 22:1, which is necessary to operate the engine at starting, idle and low load operations. The present engine is designed to operate on a compression ratio in the range from 12:1 to 16:1. The use of a lower compression ratio has the advantages of reducing friction horsepower and providing an engine with reduced structural loading which therefore can be made considerably lighter. The present engine overcomes the problems of starting, idling and low load operations at low compression ratios by operating on the Otto cycle using an ignition means 32 and fuel charge stratification. As indicated in FIG. 2, the fuel 36 is injected into the first combustion chamber 28 against the direction 30 of the swirling air to create a resultant force 38 on the fuel 36 whereby the fuel is stratified around the centrally located ignition means 32. It is to be noted that most of the combustion air will be in the first combustion chamber 28 and as little as possible in the second combustion chamber 18. It is well established that if the ratio of fuel to air is reduced in a conventional ignition engine to a point beyond stoichiometric, misfiring occurs and unburned hydrocarbons rise. If, however, firing were consistent at very lean overall mixtures, the three principal deleterious exhaust emissions of nitrous oxide, carbon monoxide, and hydrocarbons would be reduced simultaneously to very low values. The present engine 10 will operate at very lean overall mixtures because ignition starts in the combustion chamber 28 where it is possible to have an overall mixture which is stratified at the ignition means 32. After ignition and burning in the first combustion chamber 28 the resulting gases expand into the second combustion chamber 18 where combustion is completed. The low compression ratio results in reduced peak temperatures (lower $NO_x$), longer oxidizing reaction time (lower HC), and overall lean mixture to give excess oxygen (lower CO). By injecting the fuel 36 directly into the first combustion chamber 28 and by igniting the fuel 36 by an ignition source 32, the delay period prior to combustion is controlled and therefore the cetane number is no more of any significance.

Figure 3:
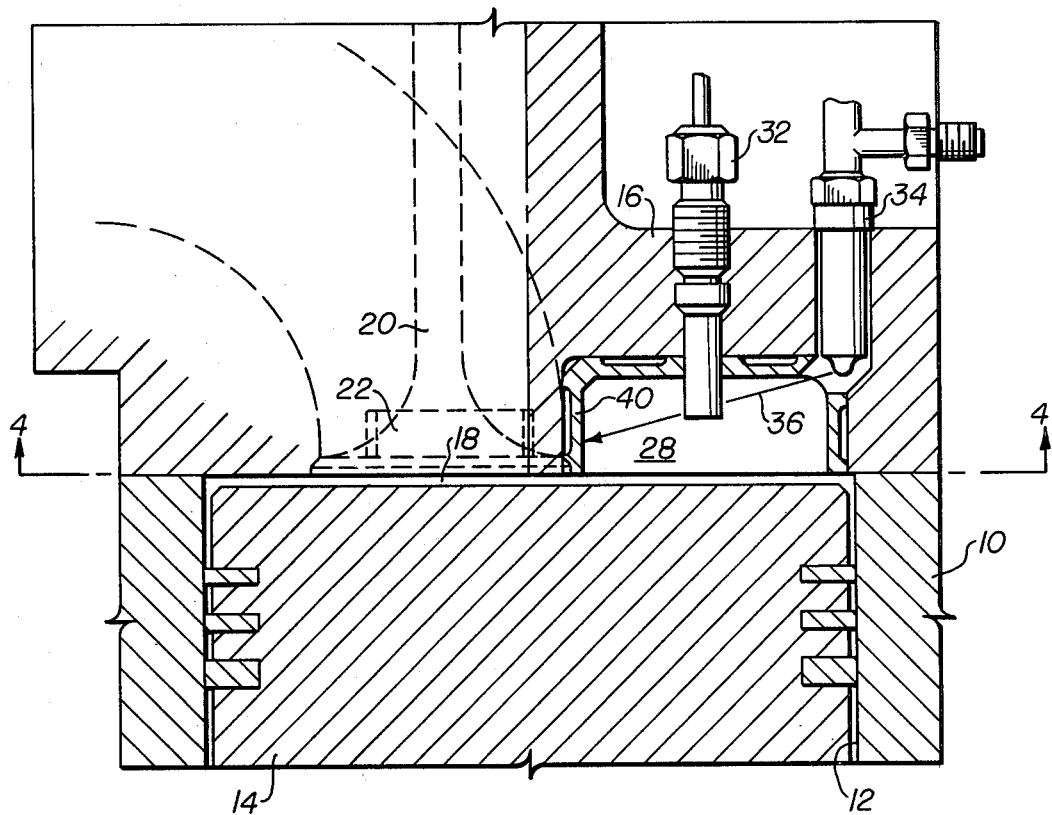
FIG. 3 is a sectional view taken along the line 3—3 of FIG. 4.
Figure 4:
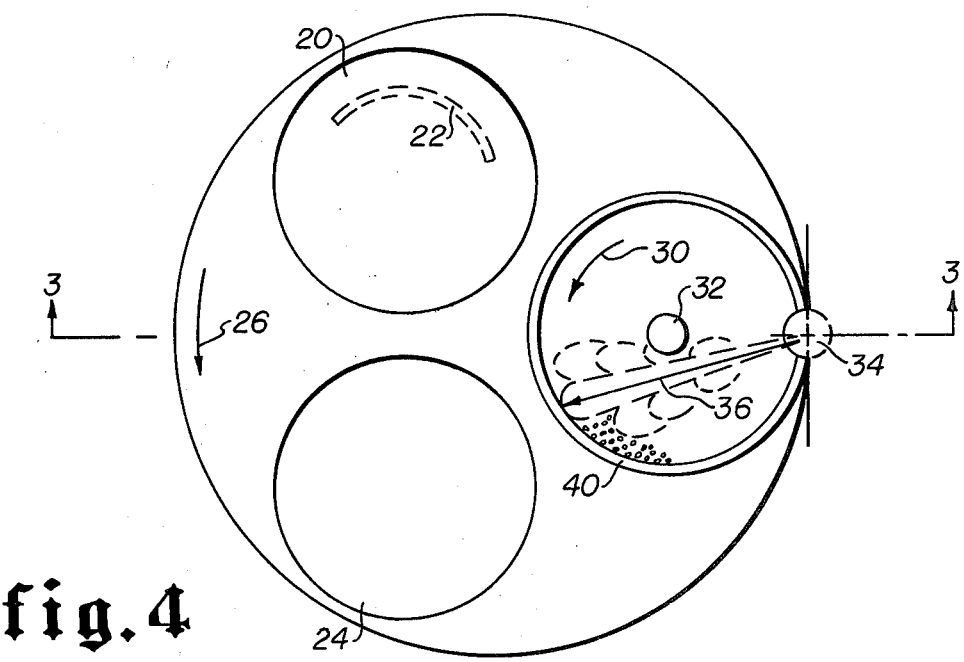
FIG. 4 is a partial horizontal sectional view along the line 4—4 of FIG. 3 through the engine cylinder illustrating the action of the intake air and fuel during high load operation.

Therefore, the operation of the engine 10 on the Otto cycle with the ignition means 34 and a stratified charge will overcome the starting, idling and low load problems of a high compression engine. However, when the fuel 36 delivery is increased at higher loads, and the engine reaches its operating temperature, the fuel-air mixture will be ignited by compression ignition. Referring now to FIGS. 3 and 4 which illustrate the present invention under high load operation, the amount of fuel 36 is increased. It is to be noted that the fuel 36 from the injector 34 is directed to impinge upon the wall 40 of the first combustion chamber 28. The chamber wall 40 will be hot and the fuel charge is impinged against the hot wall 40 in liquid form and cannot burn any faster than its evaporation rate from the wall 40, and the evaporating fluid will unite with the rotating air swirl 30 and will be ignited by compression pressure and the engine 10 switches automatically to the diesel cycle. Since the fuel 36 is injected directly into the combustion space 28 and ignited, preignition or combustion knock is no longer a problem and therefore the octane number of the fuel is of less importance. In a conventional engine system, the long ignition delay would result in rapid inflammation of a large percentage of the injected fuel producing high peak pressures and diesel knock. However, in the present invention the liquid fuel cannot burn any faster than its evaporation rate from the wall 40 and the combustion rate is reduced and diesel knock is substantially reduced. In addition, it is to be noted that since the fuel 36 is impinged upon the wall 40 of the first combustion chamber 28, rather than in the second combustion chamber 18, better control over fuel spray impingement on the chamber wall 40 is obtained.

The present invention is therefore well adapted to carry out the objects and attain the ends and advantages mentioned as well as others inherent therein. While a presently preferred embodiment of the invention has been given for the purpose of disclosure, numerous changes in the details of construction and arrangement of parts may be provided without departing from the spirit of the invention and the scope of the appended claims.

What is claimed is:

1. An internal combustion engine operating on a mixed Otto and diesel cycle comprising,
   a cylinder,
   a reciprocating piston therein,
   a cylinder head on said cylinder,
   a first combustion chamber formed in the head,
   a second combustion chamber formed by the opposed surfaces of said piston and cylinder below said head,
   an air intake passageway opening into said cylinder,
   means for causing the air passing through said passageway to swirl in said first combustion chamber,
   ignition means positioned in the first combustion chamber,
   fuel injection means in said first chamber directing fuel against the direction of swirling air in said first chamber for forming a stratified fuel charge adjacent the ignition means for ignition during starting and low loads, said injection means directed to impinge the fuel on the wall of the first chamber whereby on high loads the increased mass of fuel will impinge on the hot wall of the first chamber and will evaporate and will ignite by compression, and
   said engine having a compression ratio of less than 16:1.

2. The apparatus of claim 1 wherein said first combustion chamber is larger in volume than the second combustion chamber when the piston is at top dead center.

3. The apparatus of claim 2 wherein the first and second combustion chambers are cylindrically shaped and the diameter of the first chamber is less than the diameter of the second chamber.

4. The apparatus of claim 1 wherein said ignition means is positioned in the center of the first chamber.

5. The apparatus of claim 1 wherein the fuel injection means is positioned at one side of the first combustion chamber.

6. A method of operating an internal combustion engine having a cylinder, a reciprocating piston, a cylinder head on said cylinder and a combustion chamber formed in the head, on a mixed Otto and diesel cycle comprising,
   operating said engine at a compression ratio of less than 16:1,
   creating an air swirl in said combustion chamber,
   during starting and low load operation of said engine injecting fuel in said combustion chamber against the direction of the air swirl forming a stratified fuel charge,
   and igniting said stratified charge by ignition means whereby the engine operates on the Otto cycle, and
   during high load operation of the engine injecting fuel into said combustion chamber against the hot wall of said chamber whereby the fuel will evaporate, and igniting said evaporated fuel by compression whereby the engine operates on a diesel cycle.

* * * * *